(12) United States Patent
Bufford

(10) Patent No.: US 8,510,160 B1
(45) Date of Patent: Aug. 13, 2013

(54) SYSTEM AND METHOD FOR PROVIDING A REWARD

(75) Inventor: Joshua Bufford, Glen Allen, VA (US)

(73) Assignee: Capital One Financial Corporation, McLean, VA (US)

( * ) Notice: Subject to any disclaimer, the term of this patent is extended or adjusted under 35 U.S.C. 154(b) by 1193 days.

(21) Appl. No.: 11/614,435

(22) Filed: Dec. 21, 2006

(51) Int. Cl.
*G06Q 30/00* (2006.01)
*G06Q 40/00* (2006.01)

(52) U.S. Cl.
USPC .......................................... 705/14.33; 705/4

(58) Field of Classification Search
CPC .................................................. G06Q 30/0226
USPC .................................................. 705/4, 14.33
See application file for complete search history.

(56) References Cited

U.S. PATENT DOCUMENTS

| | | | |
|---|---|---|---|
| 5,483,444 A | | 1/1996 | Heintzeman et al. |
| 6,574,606 B1 * | | 6/2003 | Bell et al. ................... 705/14.27 |
| 2003/0171992 A1 | | 9/2003 | Blagg et al. |
| 2003/0182165 A1 * | | 9/2003 | Kato et al. ......................... 705/4 |
| 2004/0138928 A1 * | | 7/2004 | Monk ................................ 705/4 |
| 2004/0138930 A1 | | 7/2004 | Barnes et al. |
| 2004/0238622 A1 | | 12/2004 | Freiberg |
| 2005/0256750 A1 | | 11/2005 | Hand et al. |
| 2006/0053054 A1 | | 3/2006 | Baggett et al. |
| 2006/0053055 A1 | | 3/2006 | Baggett et al. |
| 2007/0129955 A1 * | | 6/2007 | Dalmia et al. .................... 705/1 |

OTHER PUBLICATIONS

Virgin Atlantic, "Terms and Conditions", <http://www.virginatlantic.com/en/us/corporateandtrade/flyingco/terms.jsp> Aug. 21, 2004 Archive accessed via Internet Archive WayBack Machine <http://www.archive.org>.*

* cited by examiner

*Primary Examiner* — Eric T Wong

(74) *Attorney, Agent, or Firm* — Hunton & Williams LLP

(57) ABSTRACT

A method and system for insuring a reward of an individual are disclosed. The method may include processing information associated with an account of the individual having an associated reward, the reward being redeemable for a good or service. Insurance coverage may be provided for the reward based upon the information, the insurance coverage operable for reissuing at least a portion of the reward after the reward is redeemed for the good or service and after a qualified loss occurs in relation to the good or service.

24 Claims, 3 Drawing Sheets

SYSTEM AND METHOD FOR PROVIDING A REWARD

FIELD

The present application relates to reward systems and methods and, more particularly, to systems and methods for providing reward insurance.

BACKGROUND

Reward programs have gained popularity as marketing tools for incentivizing individuals to perform transactions using accounts. In a conventional reward program, a reward account of the individual is linked to a financial account to allow the individual to receive a type of benefit in exchange for using the financial account in performing transactions. The benefit may be of a variety of types including the accumulation of reward units, such as reward points or miles. The reward units may be redeemed for goods and services, such as airline travel and consumer products offered by certain merchants and service providers.

Those rewards redeemed for travel related services are not insured. Therefore, if a consumer redeems a reward, such as reward units, for travel related services and the travel related services are cancelled, the reward is lost and the reward, or even a portion of the reward, is not reallocated to the consumer for later redemption for the same or different services (or goods). Furthermore, for those goods and services that have some type of insurance or warranty associated therewith, the insurance or warranty is paid for with cash or credit.

A need exists therefore for reward insurance that replenishes all or a portion of a reward used to purchase a good or service for a qualified reason. Moreover, there is a need for purchasing insurance, including warranties on goods, by redeeming a reward, such as reward units.

SUMMARY

An aspect of the present application provides for a method for insuring a reward of an individual, comprising processing information associated with an account of the individual having an associated reward, the reward being redeemable for a good or service, and providing insurance coverage for the reward based upon the information, the insurance coverage operable for reissuing at least a portion of the reward after the reward is redeemed for the good or service and after a qualified loss occurs in relation to the good or service.

Another aspect of the present application provides for A method for providing a reward associated with a reward insurance coverage claim, comprising receiving the reward insurance coverage claim from an individual, the reward insurance coverage claim being associated with a loss of a reward associated with an account of the individual, the reward being redeemable for a good or service, determining whether the reward is insured, determining whether the loss is a qualified loss, and reissuing one of the reward or a portion of the reward associated with the loss when the loss is determined to be a qualified loss.

A further aspect of the present application provides for a system for insuring a reward of an individual, comprising at least one processing unit and at least one memory unit, wherein the processing unit is configured to process information associated with an account of the individual having an associated reward, the reward being redeemable for a good or service, and provide insurance coverage for the reward based upon the information, the insurance coverage operable for reissuing at least a portion of the reward after the reward is redeemed for the good or service and after a qualified loss occurs in relation to the good or service.

DETAILED DESCRIPTION

The exemplary embodiments of the present application relate to systems and methods for providing and insuring a redeemable reward capable of being used to acquire a good, a service, or a combination of a good and service. The redeemable reward can be stored in a reward account managed by an entity, for example a financial entity, or in a reward account associated with an entity but managed by a third party. The reward account is linked to a transaction account managed by the same or a different entity that manages or is associated with the reward account.

Reward units may be redeemable for discounts from a price of goods and/or services. Additionally, reward units may be redeemable for direct exchanges for goods and/or services. In an exemplary embodiment, for example, a reward unit associated with an airline service benefit may be associated with a predetermined number of miles of airline travel. The airline mile reward unit may accordingly be redeemable for travel vouchers or airline tickets issued by an airline affiliated with an entity. Many types of reward units may be utilized, and reward unit types may be differentiated by benefits offered through redemption of the reward units. For example, reward unit types may be linked to different types of merchants, industries, service providers, the like, and the reward units may be redeemable in different forms including lodging units, airline miles, merchandise units, service units, gift certificates, cash, and the like. In an exemplary embodiment, the reward, for example in the form of reward units, may be exchanged for goods or services related to travel, such as airline travel services, hotel accommodation services, cruise travel services, rental car services, travel tour services, or restaurant services.

Figure 1:
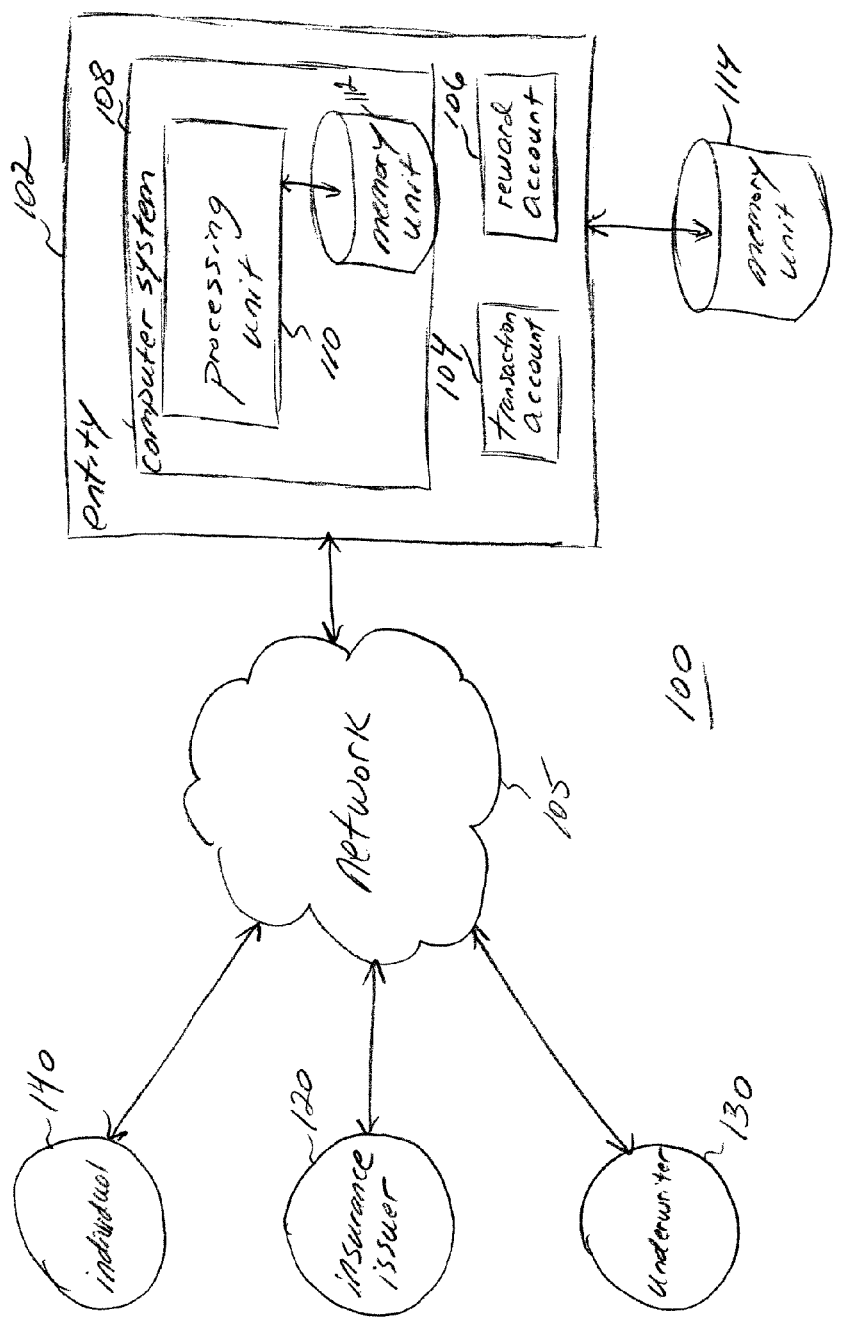
FIG. 1 illustrates an exemplary system for providing and insuring a reward according to the exemplary embodiments of the present application.

FIG. 1 illustrates an exemplary reward system 100. Reward system 100 includes an entity 102 linked to individual 140, insurance issuer 120 and underwriter 130 via network 105. The entity 102 provides various services, including establishing and maintaining reward account 106 and transaction account 104. Alternatively, reward account 106 and/or transaction account 104 can be established and/or maintained by a different entity. The entity 102 may provide financial services to individuals through the transaction account 104, and the transaction account 104 may be associated with balances and/or lines of credit. The transaction account 104 may be associated with an individual, the individual, for instance, being an identified principal holder of the account. In alternative embodiments, however, one or several entities may be associated with a single transaction account 104, including individual and enterprise entities. The entity 102 may include, for example, a bank, a brokerage, a mortgage company, a credit union, and a transaction card issuer, such as a credit card issuer. The insurance issuer 120 may be a related company of entity 102, insurance issuer 120 and entity 102 may be the same entity or insurance issuer 120 and entity 102 may be unrelated entities having a business association. Similarly, the underwriter 120 may be a related company of entity 102, the underwriter 120 and entity 102 may be the same entity or the underwriter 120 and entity 102 may be unrelated entities having a business association.

Additionally, in an exemplary embodiment, the entity 102 may be responsible for facilitating payments for transactions performed by the individual. As will be appreciated by one skilled in the art, the term "account" may include any arrangement providing for dealings or services, and may include transactions involving items, services, persons, etc.

An exemplary reward system of the present application may include software programs and/or routines stored in and executed, for example, by a computer system 108, and each software program and/or routine may be capable of performing communication with other computer systems in conjunction with conventional computer communication hardware and software. Communication between computer systems may be performed via a public communication network, for example the Internet, or may be performed via a private communication network separate from and independent of a public communication network. Additionally, the terms "computer system" and "network" as used herein may include a variety of combinations of fixed and/or portable computer hardware, software, peripherals, and memory units. Furthermore, the computer system 108 may include a plurality of individual components that are networked or otherwise linked to perform collaboratively, or may include a single, standalone component.

The computer system 108 of the present application may further include a processing unit 110, at least one internal memory unit 112, and at least one external memory unit 114. The memory units 112, 114 may include dedicated storage servers, storage-area networks, RAID configurations, and the like. Computer system 108 may also include computer system components including a random-access memory, one or more hard drive memory units, and peripherals such as keyboards, mice, and monitors for enabling input and output of information to and from the computer system 108. Software routines and/or programs may be embedded and/or stored in the internal memory unit 112 or external memory unit 114 and may be run by the processing unit 110. Additionally, the computer system 108 may be capable of network communication, and the network may include wired or wireless communication lines and associated hardware devices used in transmitting, receiving, and routing data, such as routers, switches, hubs, interfaces, and the like. The hardware and software components of the computer system 108 of the present application may include and may be included within fixed and portable devices including desktop, laptop, server, personal digital assistant, smart phone, clock, television, radio, and audio and video recording devices.

A transaction card for performing transactions may be linked with transaction account 104. The transaction card may include, for instance, a credit card, a debit card, a reward card, a check card, a stored value card, or a smart card. Usage of the transaction card to perform transactions using the transaction account 104 may be performed electronically and may be facilitated by a mechanism such as a magnetic strip positioned on the transaction card or via a processing unit incorporated into the transaction card. Accordingly, the individual may use the transaction card to perform transactions, for example purchase transactions, through a merchant using funds or credit held in the transaction account 104.

The merchant may include a vendor having a physical store carrying an inventory of products for sale to individuals, or may include a virtual store in the form of a web page presented to and usable by individuals via a communication network such as the Internet. Additionally, transaction card reading devices at merchant locations may read data encoded on the magnetic strip and/or data transmitted by the processing unit of the transaction card to identify the transaction account 104 associated with the transaction card, and the balance or credit line of the transaction account 104 may be adjusted in accordance with the transaction.

A merchant may utilize a transaction system that may be operable for performing transactions, for example purchases, sales, refunds, rebates, and the like involving products and/or services offered by the merchant. In an exemplary embodiment, the transaction system of a merchant may include a point of sale ("POS") terminal operable for reading the transaction card. Alternatively, each merchant transaction system may include an automated teller machine ("ATM"), a cash register, a transaction card reading device, a magnetic scanning device, an optical scanning device, and the like, and may include a display device and a printing device for presenting information to the individual performing the transaction. The performance of transactions involving purchases and sales of goods and services using transaction accounts and associated transaction cards is well known in the art, and therefore will not be described in detail herein.

Entity 102 may offer a reward associated with a reward account 106 that is linked or associated with the transaction account 104. The reward may include reward units, for example in the form of reward points or reward miles, and balance of reward units may be maintained in the reward account 106. Reward units may be credited to and accrued by the individual, for example, when the transaction account 104 and/or transaction card is used at a merchant providing any number of goods and/or services.

Reward units may be associated with a predetermined quantity or value of an incentive, promotion, benefit, or the like associated with the use of the transaction account 104 and/or transaction card. In an exemplary embodiment, each reward unit may be associated with a value of a transaction performed using the transaction card, for example, each dollar spent using the financial transaction account 104 and/or transaction card may correspond to the accumulation of a certain number of reward units. Further examples may include the accumulation of a certain number of reward units for every mile traveled with an airline, and/or the accumulation of a certain number of reward units for each of a particular type of transaction.

Reward units may be redeemable for discounts from a price of goods and/or services. Additionally, reward units may be redeemable for direct exchanges for goods and/or services. In an exemplary embodiment, for example, a reward unit associated with an airline service benefit may be associated with a predetermined number of miles of airline travel. The airline mile reward unit may accordingly be redeemable for travel vouchers or airline tickets issued by an airline affiliated with the entity 102. Many types of reward units may be utilized, and reward unit types may be differentiated by benefits offered through redemption of the reward units. For example, reward unit types may be linked to different types of merchants, industries, service providers, the like, and the reward units may be redeemable in different forms including lodging units, airline miles, merchandise units, service units, gift certificates, cash, and the like.

In the present application, reward system 100 provides reward insurance for a reward. Individual 140 may automatically receive reward insurance coverage for the reward from the insurance issuer 120 or from another party, for instance, upon the establishment of reward account 106, upon the accumulation of a reward, upon the redemption of a reward or any other time after establishing the reward account 106 irrespective of accumulation and redemption of a reward. Alternatively, the individual 140 may have an option to obtain insurance for the reward from insurance issuer 120, in which case the individual 140 may also have the ability to choose from a selection of different reward insurances. The different reward insurances may have different purchase costs, terms of enrollment, and/or terms of use.

In an exemplary embodiment, for instance, the reward insurance may protect against loss of and/or damage to an item purchased with or exchanged for a quantity of reward units. In an alternative exemplary embodiment, the reward insurance may provide reimbursement for and/or replacement of travel services purchased with or exchanged for a quantity of reward units. The reward insurance for travel services may be utilized whether the travel services were utilized for a reason covered by the reward insurance, or for a reason not covered by the reward insurance.

If a cost is associated with obtaining the reward insurance, the cost of the insurance may be borne by insurance issuer 120 or by individual 140. Individual 140 can pay for the reward insurance by redeeming a reward, for instance, redeeming a predetermined amount of reward units, money, or a combination of reward redemption and monetary payment. If the individual 140 redeems a reward, such as reward units, for reward insurance, the entity 102 may compensate the insurance issuer 120 and/or underwriter 130.

The reward insurance may be underwritten by entity 102. Alternatively, the reward insurance may be passed off or cross-sold to be underwritten by another entity, such as insurance issuer 120 or underwriter 130. For example, a website of entity 102 may be operable to direct the individual 140 to another website where insurance coverage for the reward may be obtained from the other entity. In the instance when an entity, such as the insurance issuer 120, passes off the insurance coverage to a third party entity, such as underwriter 130, the insurance issuer 120 could gain a profit, the profit being the difference between the cost paid by the individual 140 and the cost of coverage charged by the underwriter 130. Alternatively, the insurance issuer 120 may direct the individual 140 or entity 102 to the underwriter 130 or another entity, and consequently receive a transaction fee, such as a commission or finders fee. If the individual 140 is passed off or cross-sold to the other entity that underwrites insurance, entity 102 may also receive compensation.

The individual 140 may have the ability to select between one or more of a plurality of different underwriters and/or different insurance issuers. The individual 140 may also have the ability to select amongst different insurance coverage offered by an underwriter or insurance issuer. The potential underwriters or insurance issuers may bid against one another for the opportunity to underwrite the insurance coverage, or for the opportunity to issue and offer coverage directly to the individual 140.

In an exemplary embodiment of the present application, the reward insurance provides an assurance that a qualified loss, or partial qualified loss, of a good or service acquired through reward redemption is remedied in the event that certain conditions required by the reward insurance are met.

In various exemplary embodiments, such conditions may include injury to or death of one or more travelers, injury to or death of an immediate or extended family member of a traveler, a travel accident occurring to the traveler while en-route to a destination, military action or civil unrest in the region of the travel destination, a natural disaster in the region of the travel destination, military action or civil unrest in a region of the individual's origin of travel, natural disaster in the region of the individual's origin of travel, the individual chooses not to travel, legal action against the individual, property damage sustained by resort and/or hotel accommodations, property damage caused by a provider of lodging or travel services, airline or travel service default or bankruptcy, airline or travel service cancellation, and the like. For non-travel related policies, such covered losses may include damage to goods during delivery, damage to goods when moving, theft of cash or goods, bankruptcy or default of a provider of a good or service, stock-out or lack of availability of a good or service, and the like.

When a reward, for instance in the form of reward units, was redeemed for a good or service and a loss was realized on the good or service, the reward insurance may provide a replenishment of all or a portion of the reward used to acquire the respective good or service. Alternatively, the reward insurance may provide for repair or replacement of a good or service acquired through redemption of the reward, instead of or in addition to replenishing all or a portion of the reward used to acquire that good or service.

Travel insurance is an exemplary type of insurance that an issuer of the reward program or financial account may provide to an individual. Qualified losses may include, for instance, travel cancellation within a predetermined period of time or for one or more of a plurality of predetermined reasons. The plurality of predetermined reasons may include accidental death or medical emergency, interruptions and/or delay of travel, emergency medical and/or health expenses related to travel, lost or damaged baggage, emergency evacuation, and other travel related losses. The losses may be limited to losses incurred through no fault of the individual, or may include losses attributable to action of the individual such as voluntary travel cancellation, errors in travel reservations, and the like.

The qualified losses described above are merely exemplary. Such losses may be associated with, for example, airfare, cruises, car rental, hotel, room and board, and the like. When the loss is qualified, the travel insurance may provide a reimbursement of all or a portion of a reward, such as reward units, money, or a combination of both that was used in acquiring the associated travel service because the travel was, for instance, cancelled, missed, or otherwise devalued for one or more qualified reasons. Alternatively, even if the loss is not qualified, the travel insurance may provide a reimbursement of all or a portion of a reward, such as reward units, money, or a combination of both that was used in acquiring the associated travel service.

Figure 2:
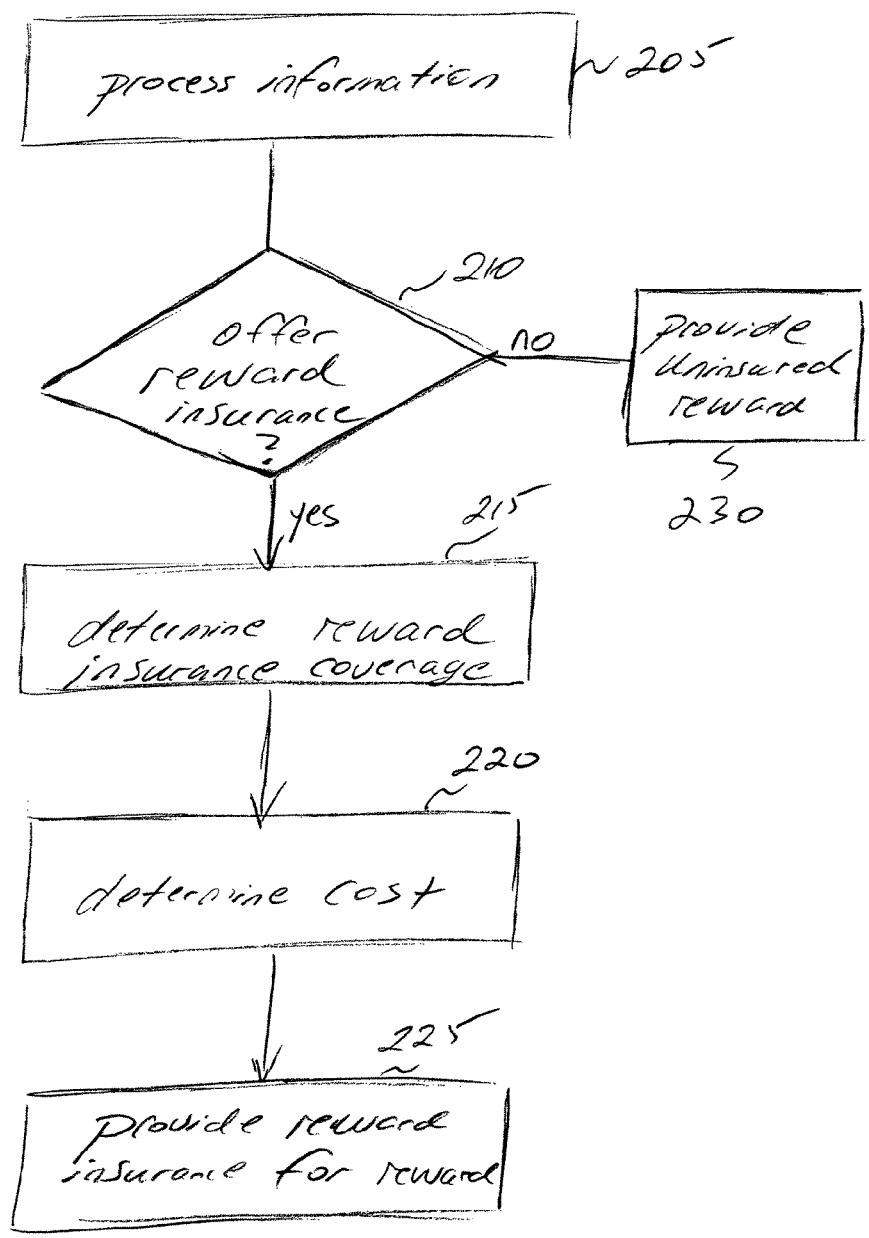
FIG. 2 is a flow diagram illustrating an exemplary method for insuring a reward according to the exemplary embodiments of the present application.

FIG. 2 provides an exemplary flow diagram for providing reward insurance. At 205, processing unit 110 may process information associated with the individual, reward account 106, and/or transaction account 104. In alternative exemplary embodiments, entity 102, insurance issuer 120, and underwriter 130 may be the same or different entities. Therefore the information may be processed by other processing units instead of or in addition to processing unit 110. The information may be stored, for example, in internal memory unit 112 and/or external memory unit 114.

In an exemplary embodiment, the information may include identification information such as a reward identification, an individual name, an individual address, an individual taxpayer identification number, individual driver's license number and record, associated financial entity information, information associated with other reward accounts of the individual, a credit limit of a preexisting transaction account of the individual, individual financial asset information, individual financial history information, individual employment information, individual criminal and civil litigation history, and the like. Additional information may include, for instance, demographic information of the individual, a history of purchases by the individual of a type of product or service, a history of purchases by the individual at a particular merchant, a history of purchases by the individual in a geographical region, and the like. The demographic information of the individual may include information related to the individual's age, sex, residence, family status, driving record, and the like. The information of the individual may relate to a single preexisting account of the individual, or may relate to a plurality of preexisting accounts of the individual.

In an exemplary embodiment, the processing may be performed using software programs and/or routines run by the processing unit 110, and may include searching internal memory unit 112 or external memory unit 114. Additionally, information retrieved from external databases and sources of information stored in one or more external memory units 114 may be utilized in the processing. For example, databases storing historical financial behavior information, such as credit score information and criminal background information, may be searched utilizing the collected individual identification information. The processing may, for example, include identification of individual assets and individual behavior patterns, and assignment of relative weightings to each identified item.

In an exemplary embodiment, the information may include information associated with the good and/or service acquired with the reward. For instance, identification information of a good or service, identification information of a merchant providing the good or service, location information identifying where the good or service is acquired, information identifying a travel destination, information identifying a type of travel (e.g., by automobile, by air, by sea, etc.), information identifying a length of travel, and the like.

In an exemplary embodiment, the processing of step 205 may include evaluation of the information to determine a relative risk associated with the good or service acquired or a relative risk associated with the individual. The relative risk determination may include analysis of historical transaction data and/or other data indicating previous transaction experiences of the individual 140, or of other individuals such as holders of other accounts managed by entity 102.

The determination may additionally include analysis of statistical data associated with goods and services provided by third party sources. For instance, a risk of loss of a particular type of good or service may be relatively high, or a risk of cancellation of a travel service rendered by a particular travel company or to a particular geographical region may be elevated, based on previous transaction history of the individual 140 or of other individuals. Risk assessment models may be developed utilizing the demographic, geographic, transactional, and other information. The determining may also include the use of employees to draw subjective conclusions.

After processing the information, processing unit 110 may determine whether to provide reward insurance to the individual 140 based upon the processing, at 210.

In an exemplary embodiment, the reward insurance may be automatically provided to the individual 140 for the reward. The automatic provision may be performed, for instance, at a time of acquiring the reward. The automatic provision may be performed irrespective of any determination of relative risk of loss, as described above.

In an alternative exemplary embodiment, processing unit 110 may determine whether to offer reward insurance depending on one or more factors, including for instance, the type of reward, the type of reward account 106, the type of good and/or service acquired, the individual information, and the like. One or more other exemplary factors may be utilized in determining whether to offer reward insurance, including for instance a level of risk associated with the individual 140 based upon a credit profile of the individual 140, a history of usage of a credit account, a line of credit, and the like, a history of fraud claims associated with the individual 140, and/or health information associated with the individual 140. Additional exemplary factors may include a relative level of risk associated with a travel destination; a relative level of risk associated with a travel commencement location; a relative level of risk associated with a type of travel and/or a vehicle used for travel (e.g., travel by light aircraft, by hot-air balloon, by horseback, by camel, etc.); a relative level of risk associated with a time of day of travel (e.g., travel during periods of heavy congestion, travel during night hours, etc.); a relative level of risk associated with a season of travel or of a time of travel in particular geographical areas (e.g., travel during hurricane season to a location prone to hurricane damage, etc.); and/or a relative level of risk associated with a type or character of merchandise (e.g., merchandise having a relatively high level of risk of damage, loss, or theft).

If processing unit 110 determines not to offer reward insurance at 210, an uninsured reward is issued or the previously issued reward remains uninsured, at 230. In an alternative exemplary embodiment, when the insurance is provided at no additional cost to the individual 140, the individual 140 may be notified of the determination and may be given an offer to purchase the insurance through payment of a fee.

When processing unit 110 determines to offer reward insurance, at 210, however, processing unit 110 may then determine a reward insurance coverage, at 215.

In an exemplary embodiment, only one reward insurance may be offered for a reward. Therefore, processing unit 110 may associate that reward insurance to the reward. The reward insurance may include coverage for one or more qualified losses and may be associated with various conditions that must be complied with for offering of the coverage. These conditions may include, for example, that reward account 106 and/or transaction account 104 is active and not in default, that the reward was not already redeemed, that the redemption occurred within a predetermined period of time, and the like. Other exemplary conditions may include whether an account of the individual 140 is open, active, or in a non-collections state; an absence of fraud; proximity to a date of travel within a particular period of time; a minimum quantity of redemption of reward units; and/or limitations associated with a number of policies associated with a particular trip (e.g., a total number of travelers, etc.).

In an alternative embodiment, multiple reward insurances may be provided for the reward. The multiple reward insurances may be associated with different goods and/or services, different groups or classifications of individuals, and the like, and may be associated with rewards held in different reward accounts.

The reward insurance coverage may be determined at 215. In an exemplary embodiment, the coverage may apply to all rewards associated with the individual 140, and may cover all qualified losses incurred with respect to goods and/or services acquired with the rewards. Alternatively, the reward insurance coverage may cover only a portion of the rewards of the individual 140, or may cover only a portion of any qualified losses incurred. The coverage may be unconditional, or may include conditions such as redemption deadlines, good and/or service type restrictions, travel destination restrictions, and the like, as described above.

In an exemplary embodiment, the reward insurance coverage may provide a full or partial reimbursement of the reward utilized to acquire the good and/or service. In an alternative embodiment, the reward insurance coverage may provide an in-kind replacement, substitution, or cash payment corresponding to a value of the good and/or service subject to the qualified loss. In alternative exemplary embodiments, for instance, the reward insurance coverage may provide a replacement of a reward utilized to acquire a travel service subject to a qualified loss, or may provide a substitute service for the travel service subject to a qualified.

In an exemplary embodiment, the individual 140 may be able to choose a type or extent of coverage of the reward insurance coverage. Alternatively, the type or extent of coverage may be predetermined or determined based on other factors, for example on a type of account of the individual 140, on reward or cash balances of the individual 140 in accounts managed by the entity 102, on a type of good or service acquired, on a history of transactions, on a length of time of holding of an account, and the like.

Upon determination of the insurance coverage provided, a cost of the insurance coverage may be determined at 220. The cost may be determined based on any of the factors and/or information described above, for instance a character or type of good or service acquired, individual information, and the like. The cost of the insurance coverage may be adjusted depending on a relative risk assessment associated with the type and/or location of goods or services acquired, individual financial information, individual transaction information, times and/or dates of acquisition of the reward or reward insurance coverage, and other factors. Further, the cost of the reward insurance coverage may be based on factors evidencing the individual's 140 need for coverage or an ability of the individual 140 to pay for the reward insurance coverage. The cost may be calculated as a cash value, or may be converted into a corresponding quantity of a reward, such as a quantity of reward units.

The reward insurance coverage may be provided at 225. In an exemplary embodiment, the cost of the reward insurance coverage may be charged to the individual, for instance in the form of a cash payment delivered independently. Alternatively, the cost may be charged in the form of additional reward, such as reward units, that may be incorporated into the cost of the good or service, or deducted from a balance of reward units of the individual at a time of acquisition of the good or service.

For instance, at a time of acquisition of a travel service, such as an airline ticket, in exchange for a reward, such as a predetermined quantity of reward units, an additional quantity of reward units may be charged corresponding to the cost of the reward insurance coverage, as determined at 220.

In an alternative exemplary embodiment, the cost of the reward insurance coverage may be determined and borne by the entity 102 or another entity, or may be incorporated into other fees and/or charges levied against the individual 140, for instance, account maintenance fees, interest charges, transaction fees, late fees, and the like.

In an alternative exemplary embodiment, the provision of the reward insurance coverage may be automatically performed at a time of acquisition or earning of the reward by the individual 140, and may not be associated with a request by the individual 140. Furthermore, the reward insurance coverage may be associated with the reward for all or part of a period of ownership of the reward by the individual 140. For instance, the reward insurance coverage may cover the reward indefinitely, or may expire at the termination of a predetermined period of time.

Figure 3:
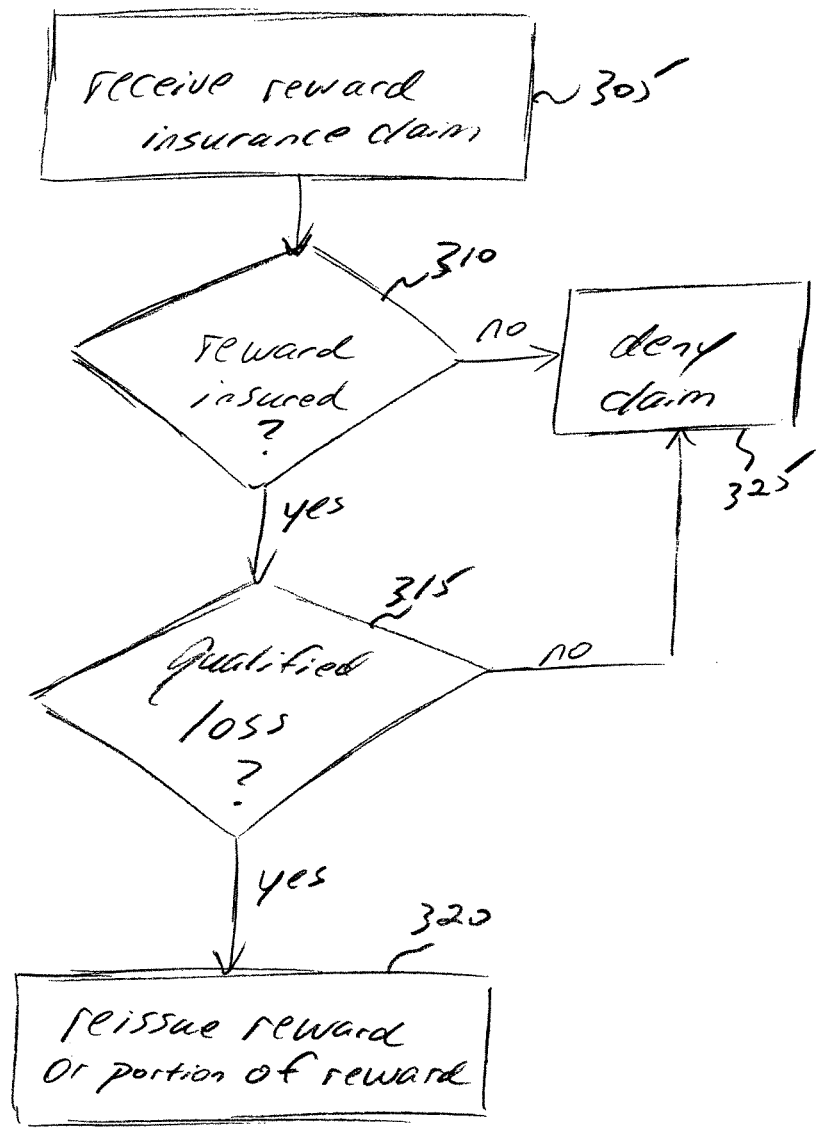
FIG. 3 is a flow diagram illustrating an exemplary method for determining insurance coverage for a reward loss according to the exemplary embodiments of the present application.

Referring to FIG. 3, a reward insurance coverage may be determined, for example in response to receipt of a claim from the individual 140. A reward insurance claim may be received at 305. The claim may be in the form of a paper document, an electronic communication delivered via the network 105, facsimile, and the like. The reward insurance claim may include identification information of the reward and the individual, and all information necessary to describe and identify the loss associated with the reward insurance claim. For instance the reward insurance claim may include a description of the loss, a location of the loss, a time and date of the loss, and additional information describing circumstances, reasons, and/or explanations associated with the claimed loss.

The reward insurance claim may additionally include account identification information, transaction identification information associated with the acquisition of the good or service, and any other suitable information necessary to identify the subject matter of the claim.

After receipt of the reward insurance claim, whether the reward associated with the claim is insured may be determined at 310, for instance by reference to information stored in the internal memory unit 112 and/or external memory unit 114. Indication of reward insurance coverage may also be obtained through communication with insurance issuer 120, underwriter 130, or other suitable entity.

When it is determined that the reward associated with the reward insurance claim is not covered, the claim may be denied, at 325. When the reward associated with the reward insurance claim is determined to be covered, whether the loss associated with the claim is qualified may be determined at 315. Such qualified losses may include any one or more of the exemplary qualified losses described above. When it is determined that the loss associated with the reward insurance claim is not qualified, the claim may be denied, at 325. When it is determined that the loss associated with the reward insurance claim is qualified, the claim may be paid, for instance in the form of reissuing the reward or part of the reward, at 320. In an alternative exemplary embodiment, the claim may be paid in another form, such as an in-kind replacement, substitution of the good or service for another good or service, cash payment, and the like.

In an alternative exemplary embodiment, the reward insurance coverage of the present application may be applied to reward units utilized in the acquisition of a benefit associated with a good or service. The benefit may include, for example, a warranty, an extended service agreement, or the like. The benefit may be offered and/or managed by a manufacturer of the good, a provider of the service, or a third party, and the benefit may be acquired through exchange of a reward, for instance, a quantity of reward units. The quantity of reward units used to acquire the benefit may be covered by the reward insurance coverage as described in the exemplary embodiments set forth above.

It should be understood that the present application is not limited to the precise exemplary embodiments described herein and that various changes and modifications may be effected by one skilled in the art without departing from the spirit or scope of the application. For example, elements and/or features of different illustrative embodiments may be combined with each other and/or substituted for each other within the scope of the present disclosure and the appended claims. In addition, improvements and modifications which become apparent to persons of ordinary skill in the art after reading the present disclosure, the drawings, and the appended claims are deemed to be within the spirit and scope of the present application.

What is claimed is:

1. A method for insuring a reward of an individual, comprising:
processing, on at least one processing unit of a computer, information associated with an account of the individual having an associated reward, the reward being redeemable for a good or service, the information associated with the account being stored in a memory unit; and
determining, on the at least one processing unit, whether to offer insurance coverage for the reward based upon the information and a result of the processing, the insurance coverage operable for reissuing at least a portion of the reward after the reward is redeemed for the good or service and after a qualified loss occurs in relation to the good or service,
wherein the determining of whether to offer insurance coverage includes determining whether to offer the insurance coverage according to one of a plurality of options, the options including offering the insurance coverage at no cost to the individual, and the options including offering the insurance coverage in exchange for at least one reward unit.

2. The method of claim 1, wherein the account includes at least one of a transaction account, a merchandise reward account, a service reward account, an airline reward account, a lodging reward account, a gift certificate reward account, a transaction card account, or a cash reward account.

3. The method of claim 1, wherein the associated reward includes at least one reward unit earned by the individual for activity conducted with the account.

4. The method of claim 1, wherein the information associated with the account includes at least one of reward identification information, individual identification information, individual financial account information, individual financial history information, individual transaction history information, individual employment information, individual litigation history information, or individual demographic information.

5. The method of claim 4, wherein the processing includes determination of a risk associated with the individual based upon at least one of the individual financial account information, individual financial history information, individual transaction history information, individual employment information, individual litigation history information, or individual demographic information.

6. The method of claim 1, wherein the service includes at least one of an airline travel service, a hotel accommodation service, a cruise travel service, a rental car service, a travel tour service, or a restaurant service.

7. The method of claim 6, wherein when the service includes a travel service the processing includes determination of a risk of a claim based upon at least one of a starting location of the travel service, a destination of the travel service, a time of use of the travel service, a season of use of the travel service, or a type of vehicle used for the travel service.

8. The method of claim 1, wherein the processing includes determination of a risk of a claim based upon at least one of a type of the good or service, a location of the good or service, or a value of the good or service.

9. The method of claim 1, wherein the processing includes determination of a cost of the insurance coverage.

10. The method of claim 1, wherein the processing includes determination of a type of the insurance coverage.

11. The method of claim 1, further comprising receiving, via a network, a payment for the insurance coverage from the individual.

12. The method of claim 11, wherein the payment includes at least one reward unit.

13. The method of claim 1, wherein the good or service is at least one of a warranty or an extended service agreement associated with a product.

14. The method of claim 1, wherein the qualified loss includes at least one of health expenses related to travel, lost travel baggage, damaged travel baggage, property damage caused by a travel service provider, property damage caused by a lodging provider, emergency evacuation during use of travel services, travel service cancellation within a predetermined period of time, or travel service cancellation due to: accidental death of the individual, accidental death of a family member of the individual, medical emergency, delay, bankruptcy or default of a travel service provider, military action or civil unrest in one of a region of a travel destination or a region of travel origin, or legal action against the individual.

15. The method of claim 1, wherein the qualified loss includes at least one of damage to goods during delivery, damage to goods while transporting goods, theft of goods, a loss incurred due to one of bankruptcy or default of a provider of goods, a loss incurred due to one of bankruptcy or default of a provider of services, a lack of availability of a good, or a lack of availability of a service.

16. A method for providing a reward associated with a reward insurance coverage claim, comprising:
receiving, via a network, the reward insurance coverage claim from an individual, the reward insurance coverage claim requesting coverage for a loss of a reward that was redeemed for a good or service, the reward insurance coverage claim being associated with reward insurance offered to the individual according to a determination of whether to offer the insurance coverage based on information associated with an account of the individual having an associated reward and according to one of a plurality of options, the options including offering the insurance coverage at no cost to the individual, and the options including offering the insurance coverage in exchange for at least one reward unit,
determining, on at least one processing unit of a computer, whether the reward is insured;
determining, on the at least one processing unit, whether the loss is a qualified loss; and
reissuing at least a portion of the reward if the loss is insured and the loss is determined to be qualified, wherein the reissuing includes storing, in a memory unit, the at least a portion of the reward that is reissued in an account associated with the individual.

17. The method of claim 16, wherein the account includes at least one of a merchandise reward account, a service reward account, an airline reward account, a lodging reward account, a gift certificate reward account, a transaction card account, or a cash reward account.

18. The method of claim 16, wherein the associated reward includes at least one reward unit earned by the individual for activity conducted with the account.

19. The method of claim 16, wherein the qualified loss includes at least one of health expenses related to travel, lost travel baggage, damaged travel baggage, property damage caused by a travel service provider, property damage caused by a lodging provider, emergency evacuation during use of travel services, travel service cancellation within a predetermined period of time, or travel service cancellation due to: accidental death of the individual, accidental death of a family member of the individual, medical emergency, delay, bankruptcy or default of a travel service provider, military action or civil unrest in one of a region of a travel destination or a region of travel origin, or legal action against the individual.

20. The method of claim 16, wherein the qualified loss includes at least one of damage to goods during delivery, damage to goods while moving, theft of goods, a loss incurred due to one of bankruptcy or default of a provider of goods, a loss incurred due to one of bankruptcy or default of a provider of services, a lack of availability of a good, or a lack of availability of a service.

21. A system for insuring a reward of an individual, comprising:
at least one processing unit and at least one memory unit, wherein the processing unit is configured to:
process information associated with an account of the individual having an associated reward, the reward being redeemable for a good or service; and
determine whether to offer insurance coverage for the reward based upon the information, the insurance coverage operable for reissuing at least a portion of the reward after the reward is redeemed for the good or service and after a qualified loss occurs in relation to the good or service,
wherein the determining of whether to offer insurance coverage includes determining whether to offer the insurance coverage according to one of a plurality of options, the options including offering the insurance coverage at no cost to the individual, and the options including offering the insurance coverage in exchange for at least one reward unit earned by the individual.

22. The method of claim 1, wherein if the insurance coverage is offered in exchange for the at least one reward unit, the insurance coverage is offered while the individual is redeeming one or more reward units for the reward, and the insurance is offered for the at least one reward unit in addition to the one or more reward units being redeemed for the reward.

23. The method of claim 16, wherein if the insurance coverage is offered in exchange for the at least one reward unit, the insurance coverage is offered while the individual is redeeming one or more reward units for the reward, and the insurance is offered for the at least one reward unit in addition to the one or more reward units being redeemed for the reward.

24. The system of claim 21, wherein if the insurance coverage is offered in exchange for the at least one reward unit, the insurance coverage is offered while the individual is redeeming one or more reward units for the reward, and the insurance is offered for the at least one reward unit in addition to the one or more reward units being redeemed for the reward.

* * * * *

UNITED STATES PATENT AND TRADEMARK OFFICE
CERTIFICATE OF CORRECTION

| | | |
|---|---|---|
| PATENT NO. | : 8,510,160 B1 | Page 1 of 1 |
| APPLICATION NO. | : 11/614435 | |
| DATED | : August 13, 2013 | |
| INVENTOR(S) | : Bufford | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1320 days.

Signed and Sealed this
Twenty-fourth Day of February, 2015

Michelle K. Lee
*Deputy Director of the United States Patent and Trademark Office*